(12) United States Patent
Huang

(10) Patent No.: US 8,928,192 B2
(45) Date of Patent: Jan. 6, 2015

(54) ELECTROMAGNETIC VIBRATOR WITH DUAL LAYER DIAPHRAGM UNIT

(71) Applicant: Tang Band Industries Co., Ltd., Zhejiang (CN)

(72) Inventor: Hsin Min Huang, Ningbo (CN)

(73) Assignee: Tang Band Industries Co., Ltd., Ningbo, Zhejiang (CN)

( * ) Notice: Subject to any disclaimer, the term of this patent is extended or adjusted under 35 U.S.C. 154(b) by 0 days.

(21) Appl. No.: 13/744,355

(22) Filed: Jan. 17, 2013

(65) Prior Publication Data

US 2013/0127266 A1 May 23, 2013

Related U.S. Application Data

(63) Continuation of application No. 12/657,197, filed on Jan. 14, 2010, now Pat. No. 8,396,244.

(51) Int. Cl.
| | |
|---|---|
| *H02K 33/16* | (2006.01) |
| *H04R 9/06* | (2006.01) |
| *H04R 31/00* | (2006.01) |
| *H02K 35/04* | (2006.01) |

(52) U.S. Cl.
CPC .......... *H02K 33/16* (2013.01); *H04R 9/06* (2013.01); *H04R 31/006* (2013.01)
USPC ........................................... 310/12.16

(58) Field of Classification Search
CPC ........ H02K 33/16; H02K 33/18; H02K 35/04
See application file for complete search history.

(56) References Cited

U.S. PATENT DOCUMENTS

| | | | |
|---|---|---|---|
| 6,665,414 B1 * | 12/2003 | Murayama et al. | 310/16 |
| 6,747,395 B1 * | 6/2004 | Satoh et al. | 310/324 |
| 2005/0201588 A1 * | 9/2005 | Funahashi et al. | 381/423 |
| 2008/0216578 A1 * | 9/2008 | Takashima et al. | 73/658 |

* cited by examiner

*Primary Examiner* — Michael Andrews
(74) *Attorney, Agent, or Firm* — Raymond Y. Chan; David and Raymond Patent Firm

(57) ABSTRACT

An electromagnetic vibrator includes an electromagnetic provider and a vibration unit, wherein the vibration unit includes a diaphragm unit and an induction coil unit affixing on an inner side of the diaphragm unit, so that when the vibration unit is mounted to the electromagnetic provider, the induction coil is inducted to the electromagnetic to generate an electromagnetic field, so as to axially vibrate the induction coil to vibrate the vibration unit.

4 Claims, 2 Drawing Sheets

ELECTROMAGNETIC VIBRATOR WITH DUAL LAYER DIAPHRAGM UNIT

CROSS REFERENCE OF RELATED APPLICATION

This is a Continuation application that claims the benefit of priority under 35 U.S.C. §119 to a non-provisional application, application Ser. No. 12/657,197, filed Jan. 14, 2010.

BACKGROUND OF THE PRESENT INVENTION

1. Field of Invention

The present invention relates to a device using electromagnetic effect to generate vibration, and more particularly to an electromagnetic vibrator and a producing method having a similar structure of the electromagnetic vibrator of the current using speakers.

2. Description of Related Arts

An electromagnetic vibrator, for example, usually comprises a core, an armature, a coil, a resonance spring, a holder or a link fork, and a vibration body or a feeding groove. The electromagnetic vibration is generated by supplying current through the coil. But this type of vibrator has a large size, the vibration frequency is low, the frequency range is small, the efficiency is low and can not sufficiently transform the electrical energy into mechanical energy. The usage of this type of vibrator is limited, especially when high frequency is required.

The existing electromagnetic vibrator, such as a speaker, comprises a vibration sheet, a suspension edge, a basin frame, a gasket between the suspension edge and the basin frame, and a magnetic loop system. The vibration sheet is attached with the suspension edge via glue. The suspension edge is also attached with the frame via glue. Problems have however been encountered that the amount of the glue will affect the mass of the vibration sheet which is a critic factor of the speaker's quality. In the point of chemistry, generally the glue is using van der Waals force or Hydrogen bond instead of chemical bond, so the reliability is always a problem. During time, the adhesives will be peeled off due to oxidization of the glue. In the mean time, the adhesive used during the producing process of the electromagnetic vibrator set on the surface of an element or between elements may intend to have uneven thickness distribution over surface of the elements. If such uneven thickness distribution of an adhesive takes place between the suspension edge and the gasket, or the vibration sheet and the voice coil of the electromagnetic vibrator of the speaker, the speaker will producing buzzing sounds, and/or the vibration sheet and the voice coil may be cause the dislodge from its proper concentric position with respect to the vibration sheet and the voice coil or the suspension edge and the gasket.

Using the adhesives between elements of the electromagnetic vibrator is still one of the main drawbacks for producing the electromagnetic vibrator. Such a product needs several processes of gluing, performed manually. The process is complex, difficult to maintain the consistency and stability, so as to the quality of the product. The application of the product is limited.

SUMMARY OF THE PRESENT INVENTION

A main object of the present invention is to provide an electromagnetic vibrator to overcome the disadvantage of current electromagnetic. Based on the vibration principle and construct of speakers, the present invention improves the structure and production process, to achieve a stable natural frequency and a high efficiency, as well as a simplified structure and high stability.

Another object of the present invention is to provide an electromagnetic vibrator, wherein an integrated diaphragm is provided to avoiding the using of an adhesive on the surface of the diaphragm, so as to avoiding the uneven thickness occurring on the surface of the diaphragm due to the inaccurate of chemical or physical characteristics of the adhesive.

Another object of the present invention also provides a process of manufacture of an electromagnetic vibrator, which is easy to perform, the product passing rate and consistency is high.

Another object of the present invention is to provide a producing method of the electromagnetic vibrator, wherein the electromagnetic vibrator can be produced with the minimum using of an adhesive or glue for coupling two elements of the electromagnetic vibrator, so as to maximize the consistency and stability of the electromagnetic vibrator.

to Another object of the present invention is to provide an electromagnetic vibrator, wherein the electromagnetic vibrator provides a simple way to co-axially align any two elements of the electromagnetic vibrator, and simplify the complicated glue or adhesive process, so as to minimize the manufacturing cost.

Another object of the present invention is to provide an electromagnetic vibrator, wherein the diaphragm unit of the electromagnetic vibrator has a bowl shape indented inwardly, so that the diaphragm unit of a vibration unit has a relatively larger space for vibrating so as to magnify the signal produced form the electromagnetic field.

Accordingly, in order to accomplish the above objects of the present invention, the electromagnetic vibrator comprises an electromagnetic provider provided for providing a magnetic field and a vibration unit, wherein the vibration unit comprises a diaphragm unit comprising a suspension layer and a vibration layer integrally affixed to the diaphragm layer, and an induction coil unit affixed to an inner side of the diaphragm unit to form the one piece vibration unit.

The electromagnetic provider and the vibration unit of the electromagnetic vibrator are arranged in such a manner that when the vibration unit is mounted to the electromagnetic provider, the induction coil unit is electromagnetically induced with the magnetic field of the electromagnetic provider to drive the induction coil unit to move in an axially movable manner so as to generate a vibration force at the diaphragm unit.

Accordingly, the present invention also provides a method of electromagnetic vibrator comprising the following steps:

(a) Forming an electromagnetic provider, wherein the electromagnetic provider is adapted for generating a magnetic field.

(b) Forming a one-piece vibration unit by the steps of:

(b.1) integrally affixing a vibration layer to a diaphragm layer to form a diaphragm unit; and (b.2) integrally affixing an induction coil unit to an inner side of the diaphragm unit; and (c) affixing the vibration unit to the electromagnetic provider in such a manner that the induction coil unit is electromangentically induced with the magnetic field of the electromagnetic provider to drive the induction coil unit move in an axially movable manner so as to generate a vibration force at the diaphragm unit.

These and other objectives, features, and advantages of the present invention will become apparent from the following detailed description, the accompanying drawings, and the appended claims.

DETAILED DESCRIPTION OF THE PREFERRED EMBODIMENT

Figure 1:
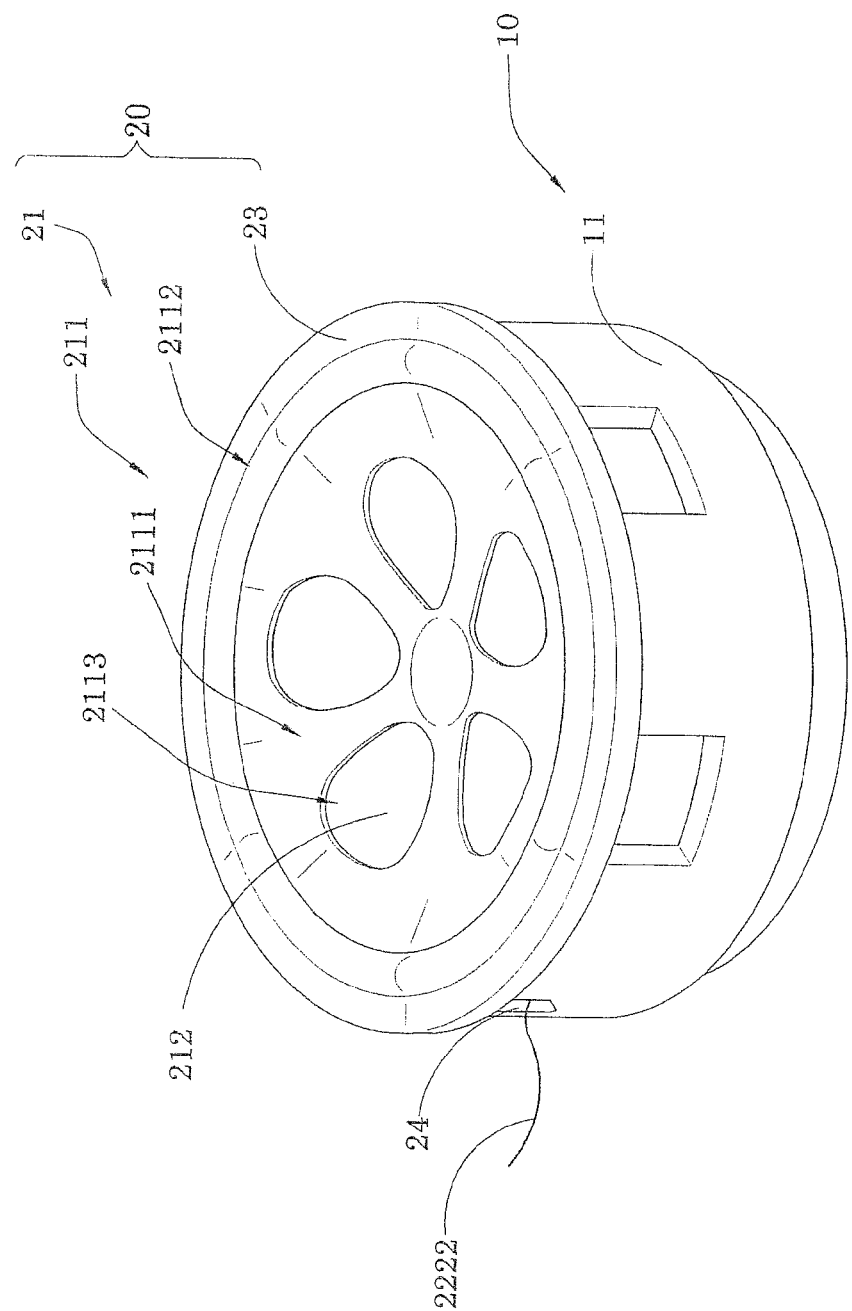
FIG. 1 is a perspective view of an electromagnetic vibrator according to a preferred embodiment of the present invention.
Figure 2:
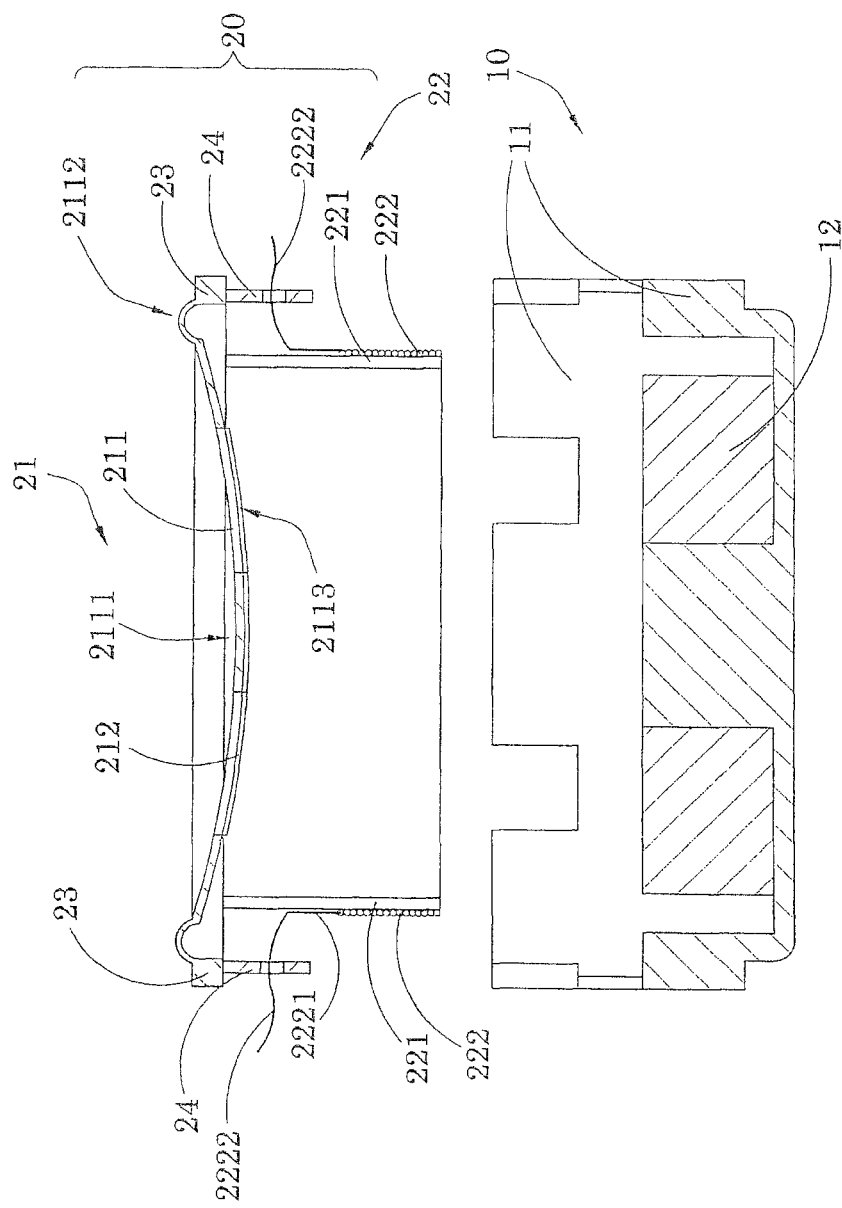
FIG. 2 is a sectional view of the electromagnetic vibrator according to the preferred embodiment of the present invention.

Referring to FIGS. 1 and 2 of the drawings, an electromagnetic vibrator according to the preferred embodiment of the present invention is illustrated, wherein the electromagnetic vibrator comprises an electromagnetic provider 10 for providing a magnetic field comprising a magnetic element 12, and a vibration unit 20 provided to generate a vibration force in an axially movable manner. The vibration unit 20 comprises a diaphragm unit 21 and an induction coil unit 22. The diaphragm unit 21 comprises a diaphragm layer 211 and a vibration layer 212 integrally affixed to the diaphragm layer 211 via injection molding or adhesive. The vibration layer 212 has a bowl shape to define a concave outer surface to integrally affix with the diaphragm layer 211, so that the diaphragm layer 211 also has a bowl shape having a concave outer surface corresponding to the concave outer surface of the vibration layer 212. The induction coil unit 22 is affixed to an inner side of the diaphragm layer 211 by using an adhesive, so that one piece of the vibration unit 20 is integrally formed for providing the axial vibration movement.

It is appreciated that the bowl shaped diaphragm unit 21 provides a relatively larger space for vibration, wherein the electromagnetic vibrator can generate a relatively larger magnified signal, so that the electromagnetic can reach the higher requirement of the magnification.

The induction coil unit 22 comprises a coil holder 221 and an induction coil 222 winded on an outer peripheral of the coil holder 221, wherein the induction coil 222 has a conductive wire 2222 mounted on coil holder 221 by one end, and an induction coil wire 2221 connected to the induction coil 222 by one end of the induction coil wire 2221, and connected to the conductive wire 2222 by the other end of the induction coil wire 2221, so that a current is provided through the conductive wire 2222 to the induction coil unit 22 of the vibration unit 20.

The diaphragm layer 211 has a center portion 2111 provided for integrally affixing and coaxially align with the vibration layer 212 and a suspension edge portion 2112 radially extended from the center portion 2111 of the diaphragm 211. The vibration unit 20 further comprises a supporting frame 23 having a tubular shape, wherein the supporting frame 23 has a top opening for affixing the suspension edge portion 2112 of the diaphragm 211 thereto, so that the vibration layer 212 is able to vibrate in an axial movement manner by the suspension edge portion 2112 of the diaphragm 211 mounted on the top opening of the supporting frame 23 of the vibration unit 20.

It is worth mentioning that the diaphragm layer 211 further has a plurality of through slots 2113 radially provided at the center portion 2111 of the diaphragm layer 211 for ensuring the concave outer surface of the vibration layer 212 being matched with the concave surface of the diaphragm layer 211. In addition, the bowl shape diaphragm unit 21 formed by injection molding can form a relatively more even thickness bowl shape diaphragm layer 211.

It is appreciated that the material of the vibration layer 212 of the diaphragm unit 21 could be copper, tinned aluminum, or PCB plate, for the purposes of conducting and adding weight. The vibration layer 212 is coated with a plastic layer (such as PP) of the diaphragm layer 211 for insulation and integrally mounting with the diaphragm layer 211.

The supporting frame 23 of the vibration unit 20 further has a bottom opening provided for mounting with the electromagnetic provider 10 by ultrasonic connection, so that the electromagnetic provider 10 is mounted with the vibration unit 20 by mounting the electromagnetic provider 20 at the bottom opening of the supporting frame 23. In such arrangement of mounting the electromagnetic provider 10 with the vibration unit 20 to link the induction coil unit 22 with the magnetic element 12 of the electromagnetic provider 10 that the electromagnetic vibrator can generate an electromagnetic field to occur a resonance, so as to vibrate the diaphragm layer 211 and the vibration layer 212 of the diaphragm unit 21.

The electromagnetic provider 10 further comprises a base frame 11 and the magnetic element 12 embedded in the base frame 11 of the electromagnetic provider 10 to form a one piece electromagnetic provider 10 for providing a magnetic field, so that when the induction coil unit 22 affixed to the inner side of the diaphragm unit 21 to form the vibration unit 20 in a one-piece integrated body, and arranged in such a manner that when the vibration unit 20 is mounted to the electromagnetic provider 10, the induction coil unit 22 is electromagnetically induced with the magnetic field generated by the magnetic element 12 of the electromagnetic provider 10 to drive the induction coil unit22 move in an axially movable manner so as to generate a vibration force at the diaphragm unit 21.

Two terminals 24 are further provided at the bottom opening of the supporting frame 23 of the vibration unit 20, wherein the terminals 24 are adapted for connecting and holding the other end of the conductive wire 2222, while the one end of the conductive wire 2222 is mounted on the coil holder 221, so that the terminals 24 are connecting to a power supply to generate the current, so as to generate the electromagnetic field to generate the resonance.

A method of producing an electromagnetic vibrator comprises the steps of:

(a) forming an electromagnetic provider 10 for generating a magnetic field, (b) forming an vibration unit 20, comprising the steps of (b.1) integrally affixing a diaphragm layer 211 with a vibration layer 212 to form a diaphragm unit 21, (b.2) integrally affixing an induction coil unit 22 to an inner side of the diaphragm unit 21 to form a one piece vibration unit 20, and (c) affixing the vibration unit 20 to the electromagnetic provider 10 in such manner that the induction coil unit 22 is electromagnetically induced with the magnetic field of the electromagnetic provider 10 to drive the induction coil unit 22 move in an axially movable manner so as to generate a vibration force at the diaphragm unit 21.

The vibration layer 212 has a bowl shape to define a concave outer surface integrally affixed to the diaphragm layer 211, wherein the diaphragm layer 211 has a concave surface corresponding to the concave outer surface of the vibration layer 212, so that the diaphragm unit 21 has a bowl shape corresponding to the vibration layer 212 and the diaphragm layer 211 to have a relatively larger space for vibration.

The step (a) further comprises the steps of (a.1) embedding a magnetic element 12 into a base frame 11 of the magnetic provider 10 to form a one piece of the electromagnetic provider 10.

The step (b.1) further comprises the steps of (b.1.1) integrally affixing the vibration layer 212 at a center portion 2111 of the diaphragm layer 211 by injection molding and (b.1.2) integrally affixing a periphery of a suspension edge portion 2112 of the diaphragm layer 211 to a supporting frame 23, which is arranged for securely affixing the vibration unit 20 to the electromagnetic provider 10. In the step (b.1.2), the periphery of the suspension edge portion 2112 of the diaphragm layer 211 can be integrally affixed to an upper opening of the supporting frame 23 by mold injection.

The step (b.2) also comprises the steps of (b.2.1) integrally affixing the induction coil 22 at the inner side of the vibration unit 20 by glue (b.2.2) winding an induction coil 222 on an outer peripheral of a coil holder 221, (b.2.3) mounting a conductive wire 2222 of the induction coil 222 on the coil holder 221 by one end, and (b.2.4) connecting an induction coil wire 2221 to the induction coil 222 by one end of the induction coil wire 2221, and then connecting the other end of the induction coil wire 2221 to the other end of the conductive wire 2222, so that a current is provided through the conductive wire 2222 to the induction coil unit 22 of the vibration unit 20.

In step (c), the vibration unit 20 is mounted on the electromagnetic provider 10 to integrally form one piece of electromagnetic vibrator by ultrasonic connection, wherein the ultrasonic connection can prevent the inaccurate amount of glue using for connecting two pieces of the electromagnetic vibrator and the glue peeling after a certain time, so that the electromagnetic vibrator of the present invention provides a relatively more consistency and durable vibrator.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electromagnetic vibrator, comprising:
an electromagnetic provider for generating a magnetic field; and
a vibration unit coupled with said electromagnetic provider, comprising:
a diaphragm unit which comprises a diaphragm layer and a vibration layer integrally affixed at a center portion of said diaphragm layer; and
an induction coil unit which is affixed to an inner side of said diaphragm unit, wherein said induction coil unit is electromagnetically inducted with said magnetic field of said electromagnetic provider to drive said induction coil unit to move in an axially movable manner so as to generate a vibration force in an axially movable manner at said diaphragm unit, wherein said diaphragm layer has a suspension edge portion, wherein said vibration layer is integrally affixed to said diaphragm layer within said suspension edge portion thereof, wherein an outer surface of said vibration layer is integrally affixed to said center portion of said diaphragm layer to match a curvature of said vibration layer with a curvature of said diaphragm layer at said center portion thereof.

2. The electromagnetic vibrator, as recited in claim 1, wherein said suspension edge portion of said diaphragm layer is radially extended from said center portion for enabling a vibration of said vibration layer.

3. The electromagnetic vibrator, as recited in claim 2, wherein said diaphragm layer further has a plurality of through slots radially provided at said center portion of said diaphragm layer for ensuring said outer surface of said vibration layer being matched with said surface of said diaphragm layer to form an integrated structure of said diaphragm unit.

4. An electromagnetic vibrator, comprising:
an electromagnetic provider for generating a magnetic field; and
a vibration unit coupled with said electromagnetic provider, comprising:
a diaphragm unit which comprises a diaphragm layer and a vibration layer integrally affixed at a center portion of said diaphragm layer; and
an induction coil unit which is affixed to an inner side of said diaphragm unit, wherein said induction coil unit is electromagnetically inducted with said magnetic field of said electromagnetic provider to drive said induction coil unit to move in an axially movable manner so as to generate a vibration force in an axially movable manner at said diaphragm unit, wherein said vibration unit comprises a supporting frame integrally extended from said diaphragm layer for securely affixing to said electromagnetic provider, wherein said diaphragm layer has a suspension edge portion, wherein said vibration layer is integrally affixed to said diaphragm layer within said suspension edge portion thereof, wherein a periphery of said suspension edge portion of said diaphragm layer is integrally affixed to said supporting frame to form said vibration unit, wherein an outer surface of said vibration layer is integrally affixed to said center portion of said diaphragm layer to match a curvature of said vibration layer with a curvature of said diaphragm layer at said center portion thereof.

* * * * *